United States Patent [19]

Williames

[11] 4,248,014
[45] Feb. 3, 1981

[54] SEEDLING CONTAINERS

[76] Inventor: Geoffrey A. Williames, 137 Normanby St., Warragul, Victoria, Australia

[21] Appl. No.: 825

[22] Filed: Jan. 4, 1979

[30] Foreign Application Priority Data

Oct. 27, 1978 [AU] Australia ............... 6548/78

[51] Int. Cl.³ ............................................. A01C 11/02
[52] U.S. Cl. ........................................... 47/86; 111/2; 47/73
[58] Field of Search ......................... 111/1-3; 47/66, 73-74, 77, 85-87

[56] References Cited

U.S. PATENT DOCUMENTS

| 3,524,419 | 8/1970 | Middleton et al. | 111/2 |
| 3,828,472 | 8/1974 | Vermeulen et al. | 47/66 X |
| 3,903,643 | 9/1975 | Blackmore et al. | 47/77 |

FOREIGN PATENT DOCUMENTS

| 1099180 | 8/1955 | France | 47/86 |
| 511896 | 7/1976 | U.S.S.R. | 111/3 |
| 513661 | 6/1976 | U.S.S.R. | 111/3 |
| 526313 | 10/1976 | U.S.S.R. | 111/2 |

Primary Examiner—Robert E. Bagwill
Attorney, Agent, or Firm—Learman & McCulloch

[57] ABSTRACT

A container assembly including a plurality of cell like compartments pivotally joined together to form a chain, the compartments including spacer members extending on opposite sides of each compartment, said spacer members including joining members adapted to pivotally interconnect in a complementary way to join said compartments, said spacer members forming a gap between the compartments adapted to receive a tooth of the driving means for moving the container assembly from one point to another.

6 Claims, 10 Drawing Figures

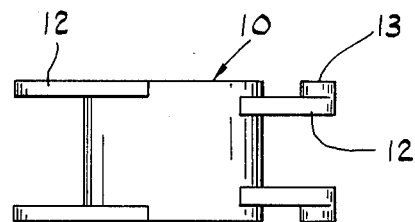
FIG. 1
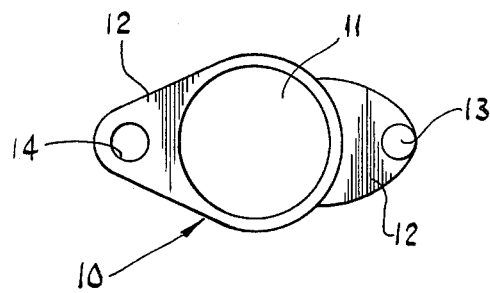
FIG. 2
FIG. 3
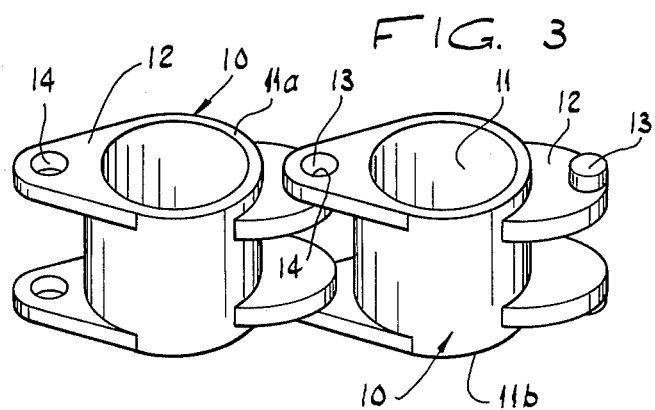

SEEDLING CONTAINERS

The invention relates to seedling containers in which seeds are planted for initial growth into a seedling and then to be subsequently transplanted into a larger container or into the field.

Large scale nursery operations entail the planting, growing and transplanting of millions of seedlings per annum. Some efforts have been made to provide individual planting out of seeds to provide individual seedlings with its own clod of earth. Thus the seedling and its own clod can be transplanted thereby preventing the usual retardation in growth associated with transplanted seedlings taken from a seed box. See Australian Patent Specifications Nos. 104,303 and 459,656. Another example of a flat is described in Australian Specification 56,660/65.

The major problem with individual planting of seeds stems from the poor germination rate of seeds and therefor poor efficiency in handling, and the irregular growth of seedlings, such that transplanting should ideally take place in different stages so that only healthy seedlings are transplanted for further propagation.

It is difficult to improve the present germination rate of seeds and there-fore it is desirable to improve efficiency in the areas such as handling of containers whilst retaining the desirable growing characteristics of single planting of seeds and each seedling being transplanted with its own clod of earth.

Much work has been carried out in this field and a popular form of container/conveyor is the so-called seed tape which usually includes a belt of plastic material forming two layers joined at spaced intervals to form cells in which a seed and nutrient can be contained. Examples of this type are disclosed in U.S. Pat. Nos. 3,734,522, 3,906,875, 3,722,137 and 3,557,489. Another type of container is disclosed in U.S. Pat. No. 3,868,054.

It is important in the germination and handling of seeds and seedlings that the various steps of the system be mechanised as much as possible. Such mechanisation involves the production of a suitable nutrient, see my pending Australian Application 34578/78 filed 30th March, 1977, the filling of a seedling cell with nutrient, see my Australian Application 37216/78 filed 20th June, 1977, and the handling and planting of seeds, see my Australian Application 34085/78 filed 11th Mar., 1977. Thus the container/conveyor for the seed and nutrient is desirably adaptable for use in mechanised systems and which will stack efficiently into a space such as a hothouse area for germination and growing of a seedling.

The present invention has as its object to provide a container/conveyor for the propagation and transport of a seedling.

A still further object is to provide a cell chain in which the tubular cell is split to allow controlled opening thereof so that the seedling and soil clod is allowed to simply fall out therefrom under gravity.

There is provided according to the present invention a container assembly adapted as a plant growing device including a series of cells, adjacent cells being pivotally interconnected to form a chain of cells, each cell having a compartment for reception of plant propagating medium and a seed or seedling.

There is provided according to a further aspect of the invention a container assembly including a plurality of cell like compartments pivotally joined together to form a chain, the compartments including spacer members extending on opposite sides of each compartment, said spacer members including joining members adapted to pivotally interconnect in a complementary way to join said compartments, said spacer members forming a gap between the compartments adapted to receive a tooth of the driving means for moving the container assembly from one point to another.

Conveniently the compartment is open ended to allow a seedling and its propagating medium to be removed as one after the seedling has grown to a predetermined height. This can be carried out by means of a simple pushing device.

There is provided in a further aspect of the invention a sensing device which may take the form of a photoelectric sensing mechanism incorporating a light source and photoelectric cell or air stream infra-red or other suitable sensing means. The device includes a transport means for transporting the cell chain with growing seedlings therein through the light beam such that if the seedling has reached a predetermined height the beam is intercepted and means are energised operable to remove the seedling and clod of propagating material from the container into a larger container for further propagation or planted out into a garden bed. The cells connected in chain form may be conveniently transported by gear like sprocket means.

According to a still further aspect of the invention there is provided a container/conveyor assembly including a plurality of cell like compartments including joining lugs pivotally interconnecting said cell like compartments, said compartments being split and formed as a pair of shells, and locking means associated with said compartment shells for locking said shells together to form said compartment, the locking means being so arranged that each compartment can open or close in series.

Conveniently the compartment members include spaced joining members adapted to pivotally interconnect the compartments.

The locking means includes lugs and interconnecting latch members the lugs being formed on each compartment shell and latched together by closure of the next preceding compartment in the series.

The invention will now be described in more detail having reference to the accompanying drawings in which:-

FIG. 1 is a side view of the compartment.

FIG. 2 is a plan view of the compartment.

FIG. 3 is a perspective view of a pair of compartments joined together in accordance with the present invention.

Figure 4:
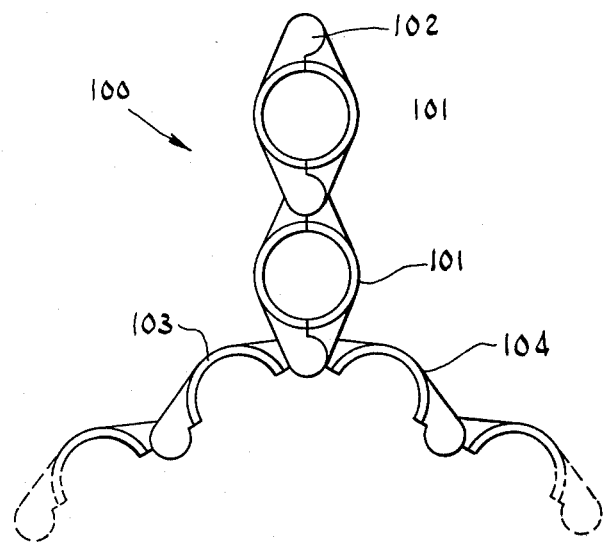
FIG. 4 is a plan view of four seedling containers and conveying device.

The container assembly will be described as being particularly suitable for containing and conveying soil and propagated seedlings.

Referring to FIGS. 1 to 3, each cell 10 includes a cylindrical compartment 11 having lugs or spacing members 12 with spigots 13 and sockets 14 thereon for interconnection to form a series of cells. Thus one side of the cell includes a pair of spaced apertured lugs 12 and the opposite side includes a pair of spaced lugs with spigots 13 thereon. The spigots are positioned to interlock with the apertured lugs of a neighbouring cell. The material forming the cell is sufficiently resilient such as plastic to allow force fitting of the spigots into the apertures. The lugs interlock pivotally, in the manner of chain links. The lugs are positioned to form a space between the compartments 11, the arrangement being such that the cells can be handled by sprocket wheels for transportation during propagation of the seedlings and thereby allowing convenient and efficient mechanical handling of the cell chain during propagation of the seedling and subsequent transplanting of the seedling. A seedling of satisfactory height may be mechanically transferred together with its clod of propagating material from its container into a seed box, a larger cellular chain or directly planted out into the field.

Thus the cell chains are suitable for mechanical movement for moving the seedlings into different environments during the propagation of the seedling at different stages.

The compartments are formed with flat support surfaces 11a, 11b such that large numbers of interconnected compartments may be stored in planar relationship. Thus the assembly fed from seed planting machines onto a support platen are then directly transported to a storage area such as a hot-house for germination of seeds and propagation of seedlings with a minimum of manual handling.

Figure 5:
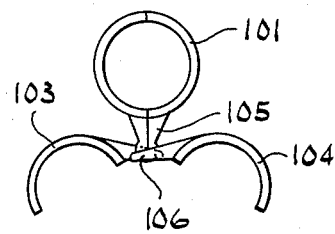
FIG. 5 is a partial plan view of the lugs and latch members in unlatched position.
Figure 6:
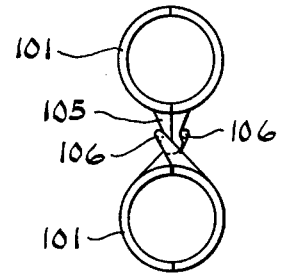
FIG. 6 is a partial plan view of the locking lugs and latch member in latched position.
Figure 7:
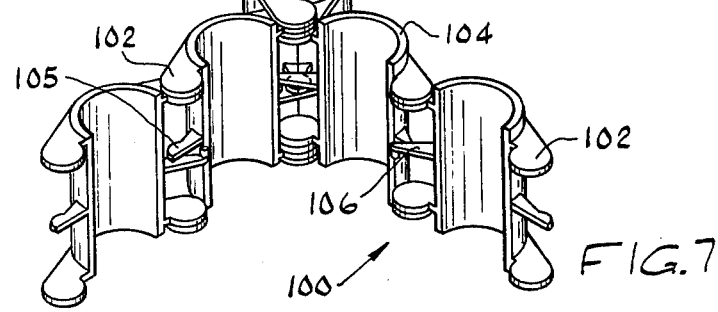
FIG. 7 is an overhead perspective view of the seedling container and conveying device.

FIGS. 4–6 disclose another embodiment in which a chain 100 of compartments 101 is formed by two groups of confronting container halves 103, 104 of shell-like or semicircular configuration. Each shell has two sets of upper and lower lugs 102 pivoted in the manner of the lugs 12 of the earlier described embodiment to the corresponding lugs of adjacent shells so as to link the respective shells of the two groups to one another.

Each shell also has an arm or lug 105 extending from one side thereof and a latch member 106 extending from the opposite side thereof. Each latch member also has a finger 107 projecting therefrom.

When any two confronting shells 103, 104 are in confronting engagement to form a cylindrical compartment 101, the lugs 105 of such shells abut one another, as shown in FIG. 5. As long as the next pair of shells confront one another to form a similar compartment, their arms 106 will occupy positions in which the respective fingers 107 engage opposite ones of the lugs 105, as shown in FIG. 6, for releasably maintaining the adjacent pair of shells in compartment forming engagement.

Upon opening of the shell halves 103, 104 as shown in FIG. 5, the lugs 106 of such halves will swing away from the lugs 105 of the adjacent compartment, thereby freeing the shell halves thereof for separation.

Figure 9:
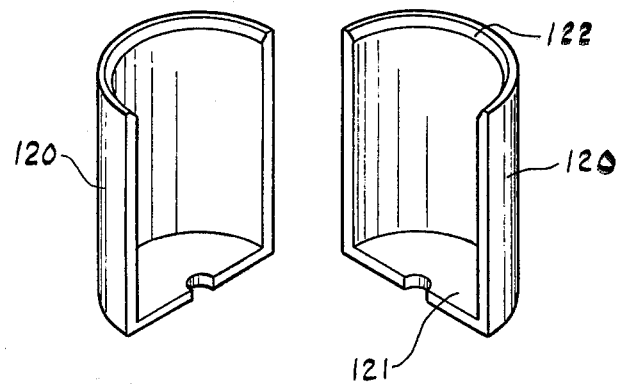
FIG. 9 is a partial perspective view of a modified container.

In a modified form shown in FIG. 9, the compartments 120 may be formed with a closed bottom 121 to avoid the possibility of loss of propagating medium during transport of the chain. The splitting of the compartment allows an enclosed seedling to drop out through the split. The top edge of each compartment may include a chamfered portion 122 to act as a guide for a hollow planting tube inserted therein during transplanting of a seedling.

In operation, to open each compartment in turn, the following sequence of events occur:- the first split shell compartment 103,104 is opened by pivoting about its pivotal axis; this opening procedure in turn moves the latching members 106 out of interfitting relationship with the split lug 105 thus allowing the opening of the next succeeding compartment and the consequent unlatching of the split lug and so on.

It will be appreciated that such a device can be used to propagate seedlings therein to a transplantable stage at which the chain with seedlings can be taken into the field for planting out. A simple planting machine may be provided to accept the chain of seedlings and to carry the chain with seedling intact near to ground level in a planting area and the shells of each compartment in series is opened up at a predetermined moment whence the seedling is dropped into a plant furrow and planted out. The shells of each compartment 101 are adapted to be separated around a pair of driving sprockets 52,53 see FIGS. 8 and 10 for separation of each compartment. A simple guide is provided to maintain the seedling centralised as each compartment splits. The guide may take the form of spaced plates, or a pair of spoked wheels to centralise the seedling as best shown in FIGS. 8 and 10.

Figure 8:
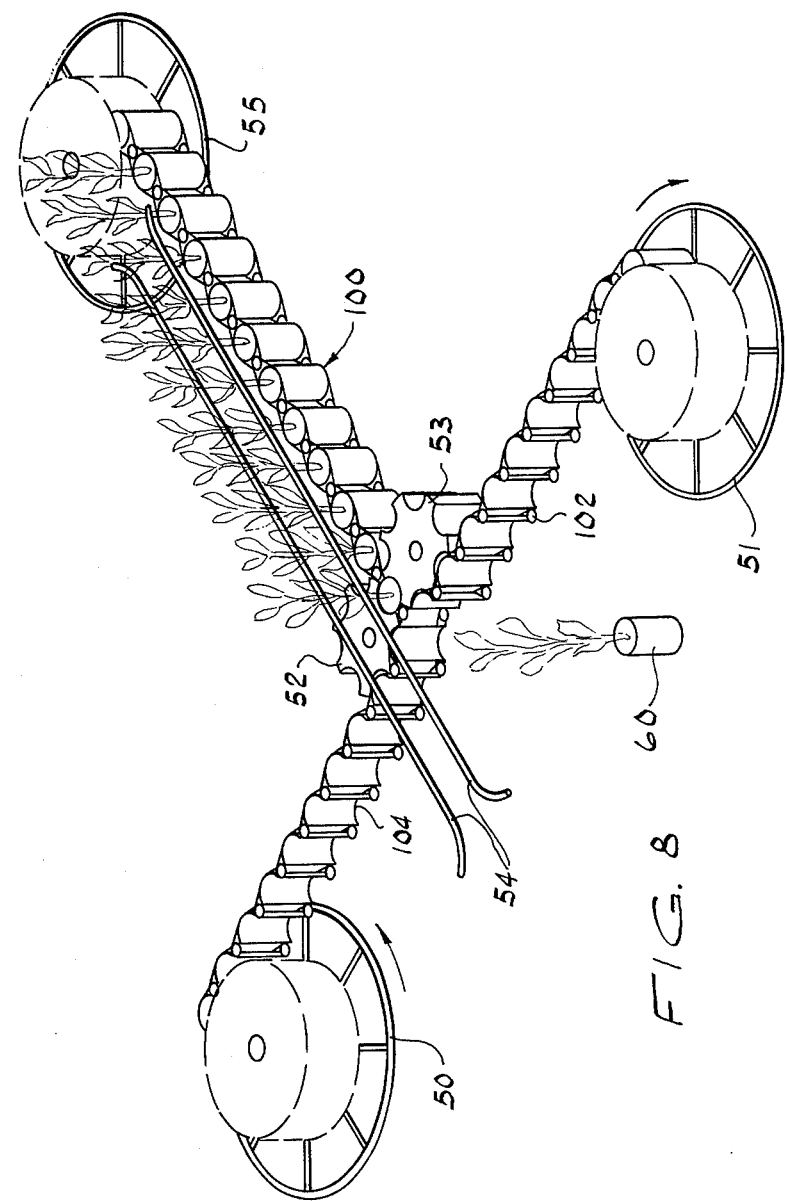
FIG. 8 is a schematic perspective view of a transplanting machine.

Referring to FIG. 8, the series of compartments are stored on a circular platen 55 upon which the seedlings 60 have been propagated. The platen is placed onto a planting machine (not shown) for planting out the seedlings. Rotatable platens 50 and 51 are mounted adjacent sprockets 52 and 53 the sprockets acting to hold the shells of the chain in closed position. The parallel rails 54 act as a guide for the seedlings as they move from the support platen to the sprockets to maintain the seedlings centralised as the individual chain shells are opened after travelling through the sprockets. Thus the centralised seedling simply falls under gravity into a furrow or hole preformed by the planting machine. The speed of movement of the machine is related to the rate of movement of the sprockets to achieve optimum spacing of the plants.

In another form of the invention the planting machine may transplant into a series of larger scale chain compartments for propagation of larger seedlings.

Figure 10:
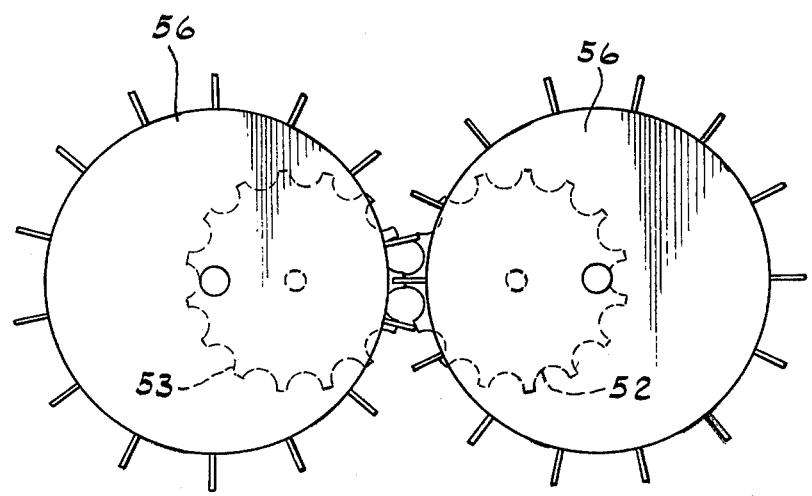
FIG. 10 is a schematic plan view of a modified form of machine in FIG. 8.

FIG. 10 shows a modified form of splitting and guiding arrangement. The sprockets 52,53 intermesh with each compartment of the chain in similar manner as described in FIG. 8. In addition, spike wheels are provided above the sprockets to intermesh with each seedling and centralise the seedling whilst splitting of the compartment shells occurs. Thus the spike wheels achieve the same centralising result as the guide rails 54.

Thus the seedling container of the invention allows conveyancing and convenient mechanised planting out of the seedling whilst there is little danger of damage to the seedling as compared with current mechanised transplanting known to Applicant.

Thus the seedling can be planted out by modified planters (which in basic form are already known) which can accept a continuous chain of cells with seedlings therein and planted out with a minimum of labour and maximum mechanical efficiency.

I claim:

1. Apparatus for use in propagating plants and supporting such plants for transport by toothed driving means, said apparatus comprising a plurality of containers open at each end and each of which forms a compartment for seeds or seedlings and a propagating medium for propagating the seeds or seedlings in the container and enabling the seeds or seedlings and propagating medium to be removed intact from said container through an open end thereof; a set of lugs carried by each of said containers and projecting laterally from opposite sides thereof to confront lugs of an adjacent container; and means pivotally coupling the confronting lugs of adjacent containers to form a linked chain of containers, said lugs spacing adjacent containers from one another and forming therebetween a gap of such size as to accommodate a tooth of said driving means.

2. Apparatus according to claim 1 wherein one end of each of said containers is flat and the opposite end is tapered.

3. Apparatus according to claim 1 wherein each of said containers is a unitary, one piece member.

4. Apparatus according to claim 1 wherein each of said containers comprises a pair of shell-like members swingable toward and away from one another.

5. Apparatus according to claim 4 including latch means carried by each of said substantially semi-circular members, the latch means of the semi-circular members of each container being engageable with the latch means of the semi-circular members of an adjacent container for releasably maintaining such semi-circular members in container-forming positions.

6. Apparatus for use in propagating plants comprising a first group of container halves pivotally joined to one another in chain form; a second group of container halves pivotally joined to one another in chain form, the container halves of said first and second groups confronting one another and together forming a chain of compartments for the accommodation of seeds or seedlings and a propagating medium; and cooperable latch means carried by each container half of each of said groups and engaging one another for releasably maintaining said container halves in compartment forming relation but enabling separation of said container halves.

* * * * *